(12) United States Patent
Takabe

(10) Patent No.: US 9,886,021 B2
(45) Date of Patent: Feb. 6, 2018

(54) CONTROL DEVICE FOR COORDINATING TRANSLATION AND REVOLUTION MOVEMENT IN A MACHINE TOOL

(75) Inventor: Tomohiro Takabe, Aiko-gun (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 545 days.

(21) Appl. No.: 14/410,008

(22) PCT Filed: Jun. 28, 2012

(86) PCT No.: PCT/JP2012/066570
§ 371 (c)(1),
(2), (4) Date: Dec. 19, 2014

(87) PCT Pub. No.: WO2014/002228
PCT Pub. Date: Jan. 3, 2014

(65) Prior Publication Data
US 2015/0323923 A1    Nov. 12, 2015

(51) Int. Cl.
*G05B 19/19* (2006.01)
*B23C 3/28* (2006.01)

(52) U.S. Cl.
CPC ................ *G05B 19/19* (2013.01); *B23C 3/28* (2013.01)

(58) Field of Classification Search
CPC .......... G05B 19/19; G05B 2219/45094; G05B 2219/50049; G05B 2219/50052; B23C 3/28; B23C 3/34
See application file for complete search history.

(56) References Cited

U.S. PATENT DOCUMENTS

| 5,564,185 | A | 10/1996 | Saeki et al. |
| 5,580,198 | A * | 12/1996 | Saeki ...................... B23P 13/02 |
| | | | 409/166 |
| 2006/0089746 | A1 | 4/2006 | Kakino et al. |
| 2012/0215334 | A1 | 8/2012 | Tanuma et al. |

(Continued)

FOREIGN PATENT DOCUMENTS

| CN | 1345648 | 4/2002 |
| EP | 2 614 909 | 7/2013 |

(Continued)

OTHER PUBLICATIONS

International Search Report dated Oct. 2, 2012, directed to International Application No. PCT/JP2012/066570; 1 page.

(Continued)

*Primary Examiner* — M. N. Von Buhr
(74) *Attorney, Agent, or Firm* — Morrison & Foerster LLP

(57) ABSTRACT

A control device for a machine tool for machining a workpiece while orbital movement is performed for causing an auto-rotating rotary tool to move in a circular manner, the control device comprising: a reading and interpreting unit for reading a machining program containing input information; and a computing unit for combining a first tool pathway along which a rotary tool travels and which has been set on the basis of input information about the travel of the rotary tool, and a second tool pathway along which the rotary tool orbits and which has been set on the basis of input information about the orbital movement, and for setting a third tool pathway along which the rotary tool travels in a machining shape while moving in an orbital manner.

3 Claims, 7 Drawing Sheets

(56) References Cited

U.S. PATENT DOCUMENTS

| | | | | |
|---|---|---|---|---|
| 2013/0156523 A1* | 6/2013 | Yamaguchi | ............... | B23C 3/32 |
| | | | | 409/132 |
| 2013/0173045 A1* | 7/2013 | Kawana | ............... | G05B 19/404 |
| | | | | 700/186 |
| 2013/0173046 A1* | 7/2013 | Kawana | ............... | G05B 19/404 |
| | | | | 700/186 |
| 2015/0151445 A1* | 6/2015 | Masumiya | ................ | B23C 3/28 |
| | | | | 83/875 |

FOREIGN PATENT DOCUMENTS

| | | |
|---|---|---|
| EP | 2 634 655 | 9/2013 |
| EP | 2 634 656 | 9/2013 |
| JP | 60-141446 | 7/1985 |
| JP | 64-8406 | 1/1989 |
| JP | 7-230312 | 8/1995 |
| JP | 10-124129 | 5/1998 |
| JP | 11-226811 | 8/1999 |
| JP | 2002-132315 | 5/2002 |
| JP | 4300275 | 7/2009 |
| JP | 2011-96077 | 5/2011 |
| JP | 2012-86296 | 5/2012 |
| WO | WO-2008/146462 | 12/2008 |
| WO | WO 2012032667 A1 * 3/2012 ............... B23C 3/32 |
| WO | WO 2012057219 A1 * 5/2012 ............ G05B 19/404 |
| WO | WO 2012057231 A1 * 5/2012 ............ G05B 19/404 |

OTHER PUBLICATIONS

Extended Search Report dated Jan. 27, 2016, directed to EP Application No. 12880039.8; 8 pages.

* cited by examiner

FIG. 7

MACHINING PROGRAM O 0001

```
O 0001

~

G 1001 A B C D (COMMAND FOR REVOLUTION)

(COMMAND FOR GROOVE PATH)

G 01 X_.Y_.F_

~

G 1000 (END OF REVOLUTION)

~
```

51

CONTROL DEVICE FOR COORDINATING TRANSLATION AND REVOLUTION MOVEMENT IN A MACHINE TOOL

CROSS REFERENCE TO RELATED APPLICATIONS

This application is a U.S. National Phase patent application of PCT/JP2012/066570, filed on Jun. 28, 2012, which is hereby incorporated by reference in the present disclosure in its entirety.

FIELD OF THE INVENTION

The present invention relates to a control device of a machine tool and to a machine tool.

BACKGROUND OF THE INVENTION

In the prior art, there has been known a machine tool which makes a rotary tool rotate to cut or otherwise machine a workpiece. Further, there has been known a numerical control machine tool which designates a tool path of a rotary tool in such a machine tool by coordinates of predetermined axes etc. so as to make the rotary tool automatically move while performing machining.

Japanese Patent Publication No. 60-141446A (PLT 1) discloses a rotary tool holder which makes a rotating tool revolve about a center of rotation of a spindle while cutting. This rotary tool holder makes a tool rotate while the tool is accelerated by a planetary gear mechanism. The center of the tool revolves about the center of rotation of the spindle. By using this rotary tool holder, even if the cutter or other rotary tool becomes worn and the rotary tool changes in diameter, the amount of offset can be adjusted to obtain an accurate width dimension.

Japanese Patent Publication No. 7-230312A (PLT 2) discloses a CNC system which is provided with a numerical control device (CNC) and a programmable machine controller (PMC). This numerical control device stores a machining program in advance. A CNC side movement command means decodes this machining program and generates CNC side axial movement commands in accordance with the content. On the other hand, the programmable machine controller stores a sequence program. A PMC side movement command means sends PMC side axial movement commands contained in the sequence program to the CNC side. The CNC system superposes the CNC side axial movement commands and the PMC side axial movement commands to control movement along the respective axes. This publication discloses that the PMC side movement command means outputs commands for causing reciprocating movement in a predetermined section of the Z-axis and the CNC side movement command means outputs commands for causing monotonous linear movement in parallel with the X-axis.

PATENT LITERATURE

PLT 1: Japanese Patent Publication No. 60-141446A
PLT 2: Japanese Patent Publication No. 7-230312A

SUMMARY OF THE INVENTION

By using a rotary tool holder which makes a rotary tool revolve around a center of rotation of a spindle while cutting as described in the above PLT 1, it is possible to form a groove part with a width larger than the diameter of the rotary tool. By using such a special tool holder, it is possible to machine a large width groove part. Alternatively, it is possible to form a hole part etc. of a size larger than the diameter of the rotary tool. The rotary tool holder which is disclosed in PLT 1 machines the workpiece by moving along the machining shape of the workpiece. That is, the rotary tool holder moves once along the desired shape for machining.

However, this rotary tool holder can only form substantially one width, so if the groove part which is formed changes in width etc., there was the problem that it was necessary to replace the rotary tool holder provided with the planetary gear mechanism. For example, when forming a plurality of groove parts with different widths at a single workpiece, it is necessary to use a plurality of rotary tool holders corresponding to the widths of the respective groove parts. In this way, when using a rotary tool holder, there was the problem that it was necessary to use a special tool which was formed to match with the shape of the part to be machined.

The control device of a machine tool of the present invention is a control device of a machine tool which makes a rotary tool rotate and makes the rotating rotary tool circulate relative to the workpiece for revolution motion while advancing so as to machine the workpiece, provided with a reading and interpreting part which reads a machining program in which input information of advance of the rotary tool which advances along the machining shape of the workpiece and input information of revolution of the rotary tool are separately input and an operating part which combines a first tool path of advance of the rotary tool which is set based on the input information of the advance of the rotary tool and a second tool path of revolution of the rotary tool which is set based on the input information of the revolution of the rotary tool to set a third tool path of advance of the rotary tool along the machining shape while revolving.

In the above invention, the first tool path can be set so that the rotary tool advances along the machining shape of the workpiece after the rotary tool revolves by a predetermined rotational angle.

The machine tool of the present invention is a machine tool which makes a rotary tool and a workpiece move relative to each other to machine a workpiece, provided with a reading and interpreting part which reads a machining program in which input information of advance of the rotary tool which advances along the machining shape of the workpiece and input information of revolution of the rotary tool are separately input, an operating part which combines a first tool path of advance of the rotary tool which is set based on the input information of the advance of the rotary tool and a second tool path of revolution of the rotary tool which is set based on the input information of the revolution of the rotary tool to sets a third tool path of advance of the rotary tool along the machining shape while revolving, and a movement device which makes uses the third tool path which is combined at the operating part as the basis to make the rotary tool and workpiece relatively move.

According to the present invention, it is possible to machine a groove part or hole part larger than the diameter of the rotary tool which is used even without using a rotary tool holder which is formed corresponding to the shape of the part which is machined.

BRIEF DESCRIPTION OF THE DRAWINGS

FIG. 7 is a schematic view of a machining program in an embodiment.

DETAILED DESCRIPTION OF THE INVENTION

Referring to FIG. 1 to FIG. 9, a control device of a machine tool and a numerical control machine tool in an actual embodiment will be explained. In the present embodiment, a horizontal machining center with a spindle which extends in the horizontal type direction will be explained as an example.

Figure 1:
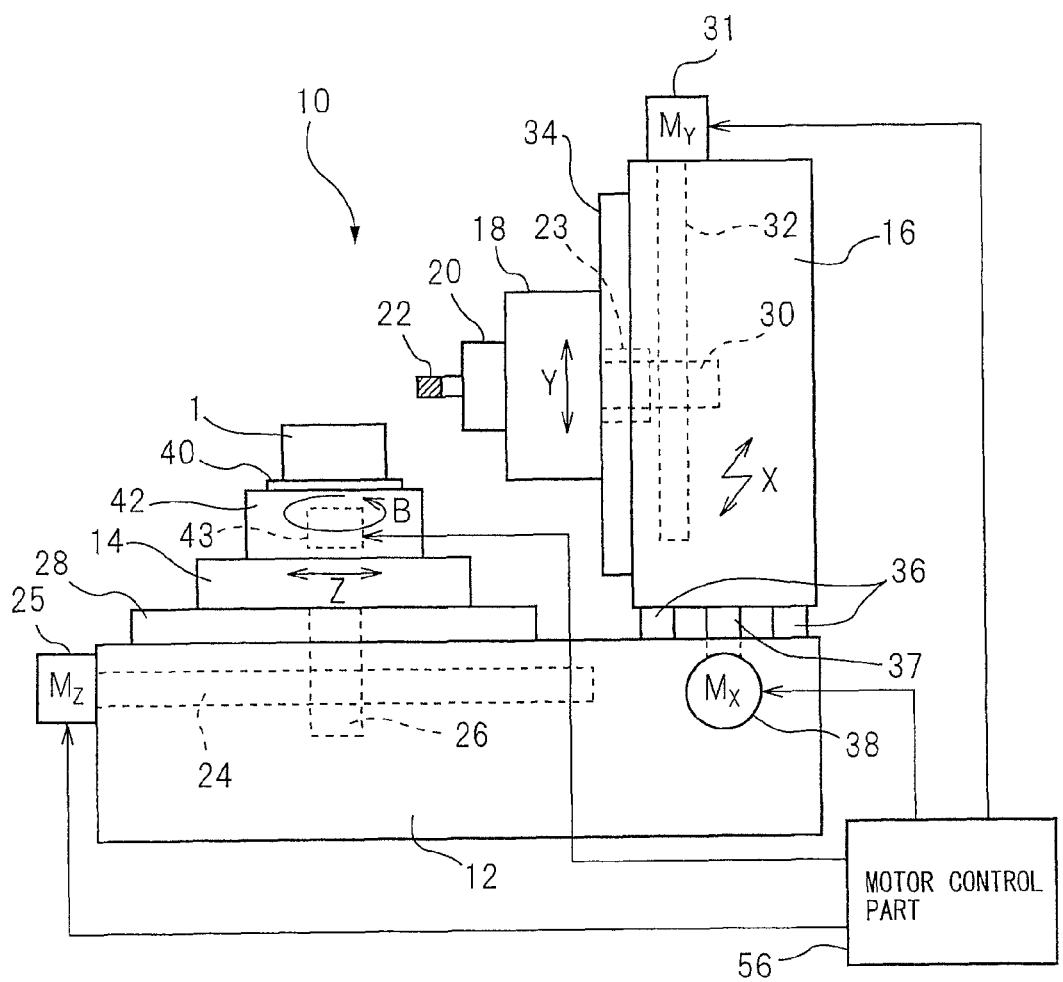
FIG. 1 is a schematic view of a numerical control machine tool according to an embodiment.

FIG. 1 is a schematic view of a numerical control machine tool in the present embodiment. The numerical control machine tool 10 is provided with a bed 12 which is set on the floor of a factory etc. On the top surface of the bed 12, a Z-axis guide rail 28 is fastened. The Z-axis in the present embodiment extends in the horizontal direction. The Z-axis guide rail 28 is arranged so as to extend in the Z-axis direction (left-right direction in FIG. 1).

The numerical control machine tool 10 in the present embodiment is provided with a movement device which makes the rotary tool 22 and the workpiece 1 move relatively. At the top surface of the Z-axis guide rail 28, a table 14 is arranged. The table 14 is arranged to be able to slide with respect to the Z-axis guide rail 28. The table 14 therefore moves along the Z-axis. On the top surface of the table 14, a numerical control type of rotary table 42 is arranged for making the workpiece 1 rotate in the B-axis direction. On the top surface of the rotary table 42, a workpiece 1 is fastened through a workpiece-use holding member 40. The numerical control machine tool in the present embodiment is provided with a device for making the workpiece 1 rotate in the B-axis direction, but when rotation in the B-axis direction is not necessary, the workpiece 1 may also be fastened to the top surface of the table 14 without interposition of the rotary table 42.

At the top surface of the bed 12, an X-axis guide rail 36 is fastened. The X-axis in the present embodiment perpendicularly intersects the Z-axis and further extends in the horizontal direction (direction vertical to paper surface of FIG. 1). The X-axis guide rail 36 is formed so as to extend along the X-axis. At the X-axis guide rail 36, a column 16 is arranged to be able to slide. The column 16 moves along the X-axis.

At the column 16, a Y-axis guide rail 34 is fastened to the front surface facing the workpiece 1. The Y-axis in the present embodiment extends along a direction perpendicular to the X-axis and Z-axis. The Y-axis guide rail 34 extends along the Y-axis. On the Y-axis guide rail 34, a spindle head 18 is arranged. The spindle head 18 is formed to be able to slide on the Y-axis guide rail 34. The spindle head 18 moves along the Y-axis. The spindle head 18 is formed so as to rotatably support a spindle 20.

The movement device of the present embodiment includes a Z-axis movement device which makes the rotary tool 22 move relative to the workpiece 1 in the Z-axis direction. In the present embodiment, at the inside of the bed 12, at the downside of the table 14, a Z-axis feed screw 24 is arranged. The Z-axis feed screw 24 extends in the Z-axis direction. At the bottom surface of the table 14, a nut 26 is fastened. The nut 26 screws over the Z-axis feed screw 24. At one end part of the Z-axis feed screw 24, a Z-axis servo motor 25 is connected. By driving the Z-axis servo motor 25 to make the Z-axis feed screw 24 rotate, the nut 26 moves in the Z-axis direction. The table 14 moves together with movement of the nut 26 along the Z-axis guide rail 28. As a result, the workpiece 1 moves in the Z-axis direction.

The numerical control machine tool of the present embodiment is provided with an X-axis movement device which makes the rotary tool 22 move relative to the workpiece 1 in the X-axis direction. The X-axis movement device, in the same way as the Z-axis movement device, includes an X-axis feed screw which is arranged at the inside of the bed 12 at the downside of the column 16. The X-axis feed screw is formed so as to extend in the X-axis direction. At the bottom surface of the column 16, a nut 37 which is screwed over the X-axis feed screw is fastened. At one end of the X-axis feed screw, an X-axis servo motor 38 is coupled. By driving the X-axis servo motor 38 and making the X-axis feed screw rotate, the nut 37 moves in the X-axis direction. The column 16 moves together with movement of the nut 37 along the X-axis guide rail 36. As a result, the rotary tool 22 moves in the X-axis direction.

The numerical control machine tool of the present embodiment is provided with a Y-axis movement device which makes the rotary tool 22 move relative to the workpiece 1 in the Y-axis direction. At the inside of the column 16, a Y-axis feed screw 32 is arranged. the Y-axis feed screw 32 is formed so as to extend in the Y-axis direction. At the back surface of the spindle head 18, a nut 30 which is screwed over the Y-axis feed screw 32 is fastened. At the top end of the Y-axis feed screw 32, a Y-axis servo motor 31 is connected. By driving the Y-axis servo motor 31 and making the Y-axis feed screw 32 rotate, the nut 30 moves in the Y-axis direction. The spindle head 18 moves together with the movement of the nut 30 along the Y-axis guide rail 34. As a result, the rotary tool 22 moves in the Y-axis direction.

The numerical control machine tool of the present embodiment is provided with a B-axis movement device which makes the rotary tool 22 move relative to the workpiece 1 in the B-axis direction. The rotary table 42 includes a B-axis servo motor 43 for making the workpiece 1 rotate. By the drive operation of the B-axis servo motor 43, the workpiece 1 rotates in the B-axis direction.

The rotary tool 22 is arranged at the front end of the spindle 20. In the present embodiment, as the rotary tool 22, an end mill is attached. At the spindle 20, a motor 23 is connected for making the rotary tool 22 rotate. By the drive operation of the motor 23, the rotary tool 22 rotates about the center axis of the spindle as the axis of rotation.

The numerical control machine tool of the present embodiment makes the rotary tool 22 rotate while making the column 16, spindle head 18, and table 14 operate in the X-axis, Y-axis, and Z-axis directions so as to cut the workpiece 1 which is fastened to the table 14 to a desired shape.

The numerical control machine tool 10 functions as a three-axis numerical control machine tool. Furthermore, when driving the rotary table 42, the workpiece 1 is made to rotate about the B-axis. In this case, the numerical control machine tool 10 functions as a four-axis numerical control machine tool which has a B-axis.

The numerical control machine tool 10 of the present embodiment sets a tool path of relative movement of the rotary tool 22 to the workpiece 1 for cutting the workpiece 1 to the desired shape. The numerical control machine tool 10 in the present embodiment is provided with a control device 60 for generating a tool path of the rotary tool 22. The tool path in the present embodiment becomes the path of the tool center point of the tip of the rotary tool 22. Note that, the tool center point in the present invention is the position of the tip of the rotary tool on the axis of rotation when the rotary tool rotates.

Figure 2:
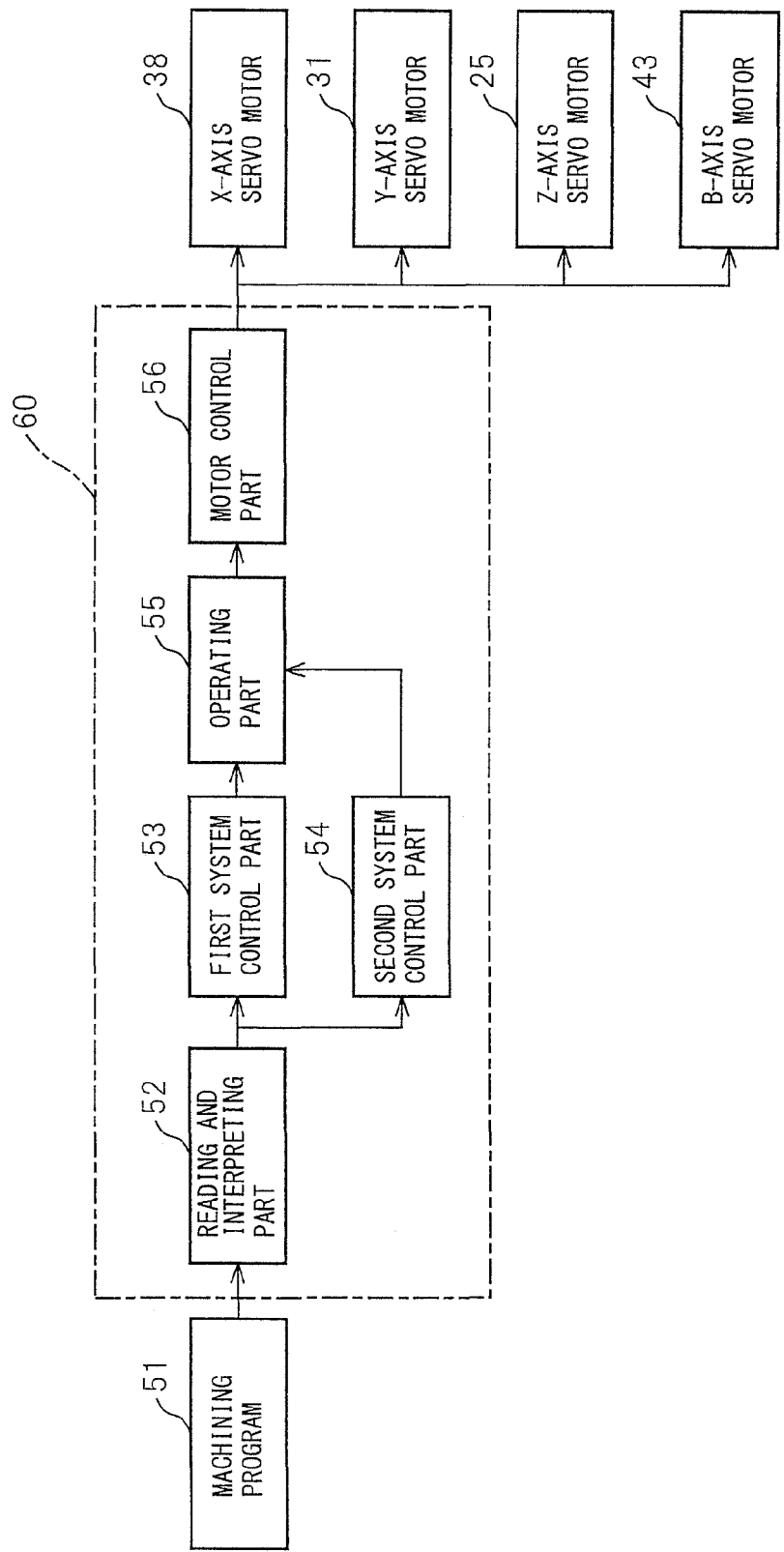
FIG. 2 is a block diagram for explaining a control device of a numerical control machine tool according to an embodiment.

FIG. 2 is a schematic view of the numerical control machine tool 10 in the present embodiment. The control device 60 in the present embodiment includes a arithmetic processing device. The arithmetic processing device has a microprocessor (CPU) which performs arithmetic processing, a ROM (Read Only Memory) and a RAM (Random Access Memory) served as storage devices, and other peripheral circuits.

The control device 60 uses a machining program 51 which is prepared by the user as the basis to calculate the relative position of the rotary tool 22 with respect to the workpiece 1. The control device 60 in the present embodiment sets the relative position of the rotary tool 22 with respect to the workpiece 1 based on the four axes of the X-axis, Y-axis, Z-axis, and B-axis. The control device 60 sets a control amount of movement for each of the X-axis, Y-axis, Z-axis, and B-axis. Based on the control amounts of the respective axes which are set by the control device 60, the X-axis servo motor 38, Y-axis servo motor 31, Z-axis servo motor 25, and B-axis servo motor 43 are driven. By the servo motors being driven, the workpiece 1 and the rotary tool 22 move relatively to the desired positions.

In the control device 60 of the present embodiment, information of a plurality of tool paths is input to the machining program 51. In the present embodiment, the user inputs two different types of tool paths to the machining program 51. The control device 60 is provided with a reading and interpreting part 52 which reads the machining program 51. The reading and interpreting part 52 uses the tool path of the machining program 51 as the basis to output machining commands to the system control part. The reading and interpreting part 52 in the present embodiment uses two different tool paths as the basis to output two different machining commands.

The system control part in the present embodiment includes a first system control part 53 and a second system control part 54. That is, it includes a plurality of system control parts. The control device 60 in the present embodiment is formed so as to output two different machining commands to the first system control part 53 and the second system control part 54. The reading and interpreting part 52 allocates machining commands to the first system control part 53 or the second system control part 54. The first system control part and second system control part, based on the received machining commands, use prestored programs to set control amounts of a first system and control amounts of a second system for the X-axis, Y-axis, Z-axis, and B-axis. That is, the tool path of the first system and the tool path of the second system for the rotary tool 22 are set.

The control device 60 in the present embodiment has an operating part 55 which combines the control amounts for the respective axes which are generated by the plurality of system control parts. The control amounts set by the first system control part 53 and the control amounts set by the second system control part 54 are input to the operating part 55. The operating part 55 combines the control amounts of the first system and the control amounts of the second system for the respective axes. The operating part 55 uses the combined control amounts, that is, the combined tool paths, as the basis to output X-axis and other axis position command values, speed command values, etc. to the motor control part 56.

The motor control part 56 uses the output of the operating part 55 as the basis to emit current command values etc. to the X-axis servo motor 38, Y-axis servo motor 31, Z-axis servo motor 25, and B-axis servo motor 43 for driving the respective axes. The respective servo motors are driven and the relative position of the rotary tool 22 with respect to the workpiece 1 is adjusted. Note that, the motor control part 56 in the present embodiment also controls the motor 23 for making the rotary tool 22 rotate.

The control device in the present embodiment has the reading and interpreting part separated from the system control part, but the invention is not limited to this. The system control part may also include the reading and interpreting part. For example, the first system control part may include the reading and interpreting part, read the machining program by the first system control part, then send machining commands of the second system to the second system control part.

Figure 3:
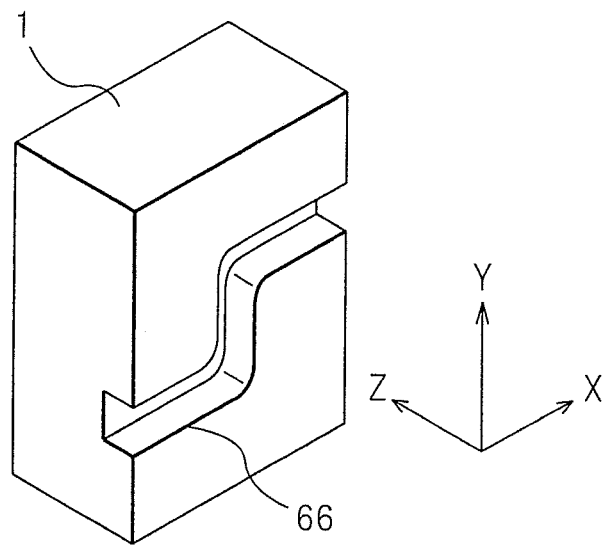
FIG. 3 is a schematic perspective view for explaining a first workpiece in an embodiment.

FIG. 3 is a schematic perspective view of a first workpiece in the present embodiment. FIG. 3 is a view of a workpiece which the numerical control machine tool in the present embodiment has finished machining. In the first workpiece 1, a groove part 66 is formed at one surface of the workpiece 1. The groove part 66 is formed by machining to cut the workpiece 1. The groove part 66 includes a straight part and a curved part. The groove part 66 is formed to become larger in width than the diameter of the rotary tool 22. The groove part 66 is formed to become constant in depth.

When forming such a groove part 66, control is performed to change the X-axis position and Y-axis position of the rotary tool 22 along the surface of the workpiece 1 without changing the depth (Z-axis position) at the time of cutting.

Referring to FIG. 1, when machining the first workpiece 1, rotational control of the B-axis direction at the rotary table 42 is stopped. The workpiece 1 is fastened to the rotary table 42 so that the machined surface of the workpiece 1 faces the rotary tool 22. At this time, the machined surface of the workpiece 1 is arranged so as to become parallel to the X-axis and Y-axis. When starting the cutting, the workpiece 1 is made to move to the desired Z-axis position. Control is performed to keep the Z-axis position unchanged until the cutting ends. The groove part 66 can be machined by planar movement in the X-axis direction and the Y-axis direction. In the following explanation, the control for maintaining the position in the Z-axis direction constant is omitted and control for movement in the X-axis direction and Y-axis direction will be explained.

Figure 4:
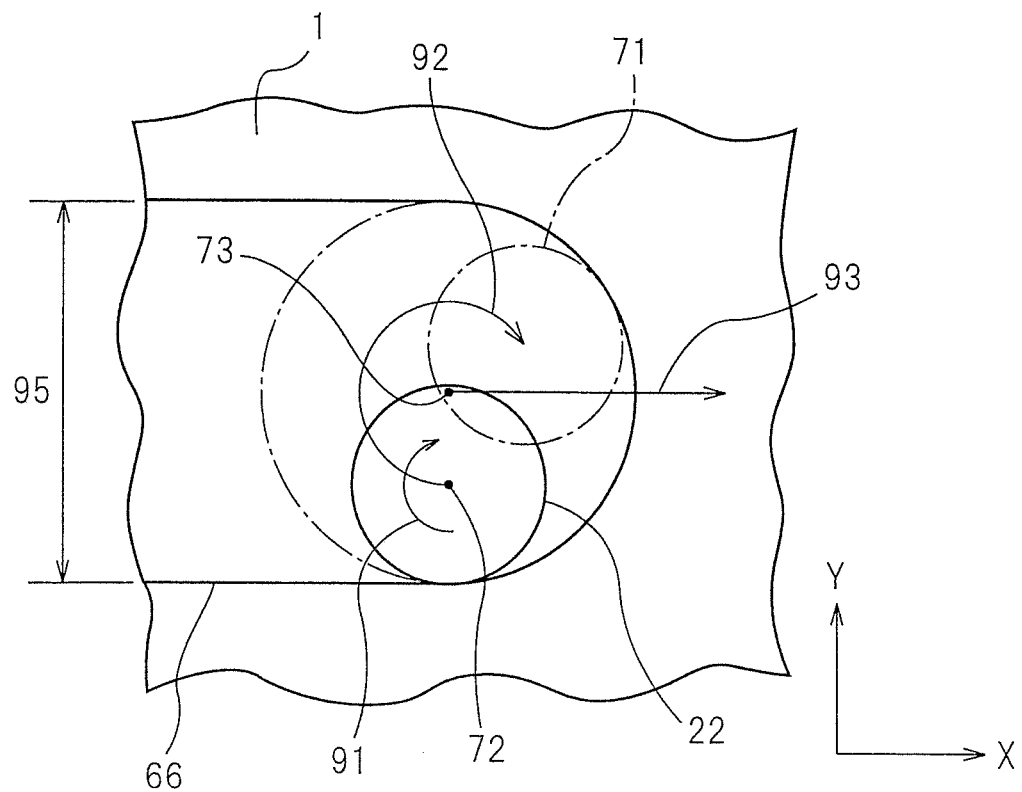
FIG. 4 is a schematic plan view of when a numerical control machine tool according to an embodiment performs machining.

FIG. 4 is a schematic plan view at the time when forming a groove part 66 in the first workpiece 1 in the present embodiment. FIG. 4 is a view when forming a straight part in the groove part 66. The rotary tool 22, as shown by the arrow mark 91, rotates about the axial line which passes through the tool center point of the rotary tool 22. That is, the rotary tool 22 rotates about the tool center point as the center of rotation 72. The width of the groove part 66 which is shown by the arrow mark 95 is larger than the diameter of the rotary tool 22. In the machine tool in the present embodiment, control is performed to make the rotating rotary tool 22 further move in circular motion. That is, control is performed to make the rotary tool 22 revolve.

In the present embodiment, as shown by the arrow mark 92, the rotary tool 22 revolves. The rotary tool 22 revolves by the center of rotation 72 of the rotary tool 22 being made to rotate about the center of revolution 73. The center of revolution 73 can, for example, set the center point of the width direction of the groove part 66. The workpiece 1 is cut by the surface of the revolving rotary tool 22 contacting the workpiece 1. Due to revolution of the rotary tool 22, a groove part 66 which is wider than the diameter of the rotary tool 22 can be formed. Next, as shown by the arrow mark 93, the center of revolution 73 is made to advance along the direction of extension of the groove part 66. By making the center of revolution 73 advance along the center line in the width direction of the groove part 66, the desired shape of groove part 66 can be formed.

Figure 5:
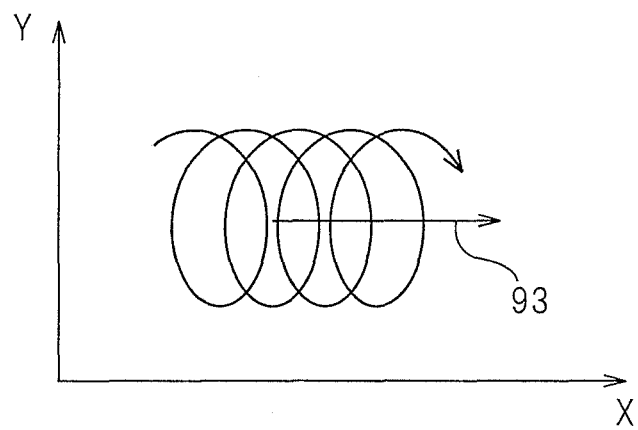
FIG. 5 is a schematic view for explaining a tool path of movement of a rotary tool in a numerical control machine tool of an embodiment.

FIG. 5 is a schematic view of a tool path of a rotary tool 22 in an embodiment. FIG. 5 shows the path of the center of rotation 72 of the rotary tool 22. The arrow mark 93 shows the direction of extension of the groove part 66. As shown in FIG. 5, when machining the first workpiece 1, the rotary tool 22 revolves while advancing, so the tool path becomes a spiral shape. Note that, FIG. 5 illustrates the case where the shape of extension of the groove part is a straight shape, but when the shape of extension of the groove part is a curved shape, the path of advance which is shown by the arrow mark 93 becomes a curved shape.

Next, the control device of a machine tool in the present embodiment will be explained in detail. Referring to FIG. 2 and FIG. 4, in the control device 60 in the present embodiment, input information on the advance of the rotary tool 22 when the rotary tool 22 advances along the machining shape of the workpiece 1 and input information on the revolution of the rotary tool 22 are input to the machining program 51. In the present embodiment, input information of the advance of the rotary tool 22 which advances along the direction of extension of the groove part 66 as shown by the arrow mark 93 and input information of the revolution of the rotary tool 22 as shown by the arrow mark 92 are individually input. The reading and interpreting part 52 outputs a machining command of a tool path along the direction of extension of the groove part 66 to the first system control part 53 and outputs a machining command of a tool path of revolution to the second system control part 54.

Referring to FIG. 4, the first system control part 53 in the present embodiment sets a first tool path of advance of the rotary tool 22 along with the shape of the groove part 66 as shown by the arrow mark 93. That is, the first system control part 53 sets control amounts of a first system of the respective axes for the revolving rotary tool 22 to move in the direction of extension of the groove part 66. The second system control part 54 sets a second tool path of revolution of the center of rotation 72 as shown by the arrow mark 92. That is, the second system control part 54 sets control amounts of a second system of the respective axes for revolution of the rotary tool 22. Control amounts of the first system of the respective axes from the first system control part 53 and control amounts of the second system of the respective axes from the second system control part 54 are combined at the operating part 55. As a result, the third tool path superposed such as shown in FIG. 5 is generated.

In this way, in the control device 60 in the present embodiment, the first system control part 53 and the second system control part 54 calculate independent control amounts, then combine them for control. In the control device 60 in the present embodiment, the coordinates in the first system control part 53 and the coordinates in the second system control part 54 are separately set.

Figure 6:
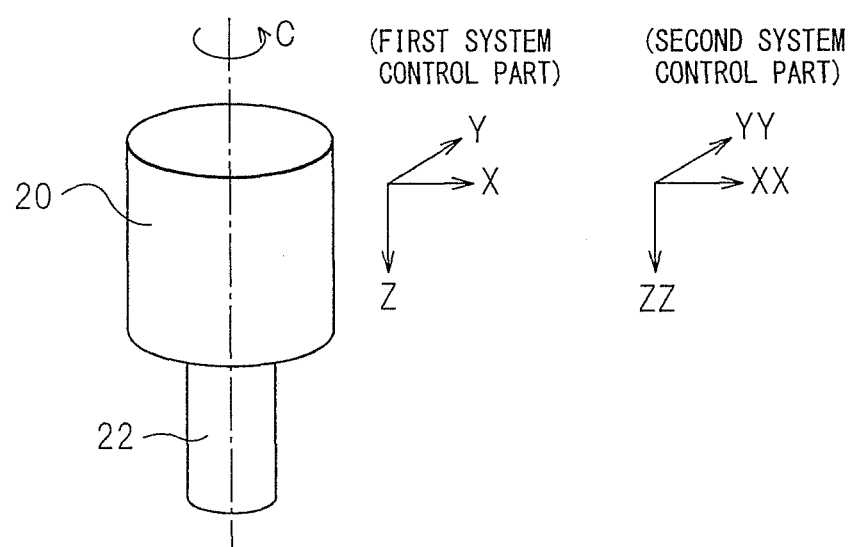
FIG. 6 is a schematic view for explaining actual axes and imaginary axes for setting movement of a rotary tool in an embodiment.

FIG. 6 is a schematic view for explaining the coordinates in the first system control part 53 and the coordinates in the second system control part 54 of the present embodiment. The rotary tool 22 revolves in the C-axis direction. In the first system control part 53, the actual axes of the X-axis, Y-axis, Z-axis, and B-axis (see FIG. 1) can be set. Further, in the second system control part 54, the XX-axis can be set as the imaginary axis corresponding to the X-axis, the YY-axis can be set as the imaginary axis corresponding to the Y-axis, and the ZZ-axis can be set as the imaginary axis corresponding to the Z-axis. Further, the BB-axis can be set as the imaginary axis corresponding to the B-axis. The respective imaginary axes are parallel to the actual axes. For example, the XX-axis is parallel to the X-axis. The imaginary axis of the second system control part 54 is the imaginary axis in the case where the rotary tool 22 in the first system control part 53 does not move. For example, referring to FIG. 4, the imaginary axis corresponds to the axis when assuming the center of revolution 73 has stopped.

Figure 8:
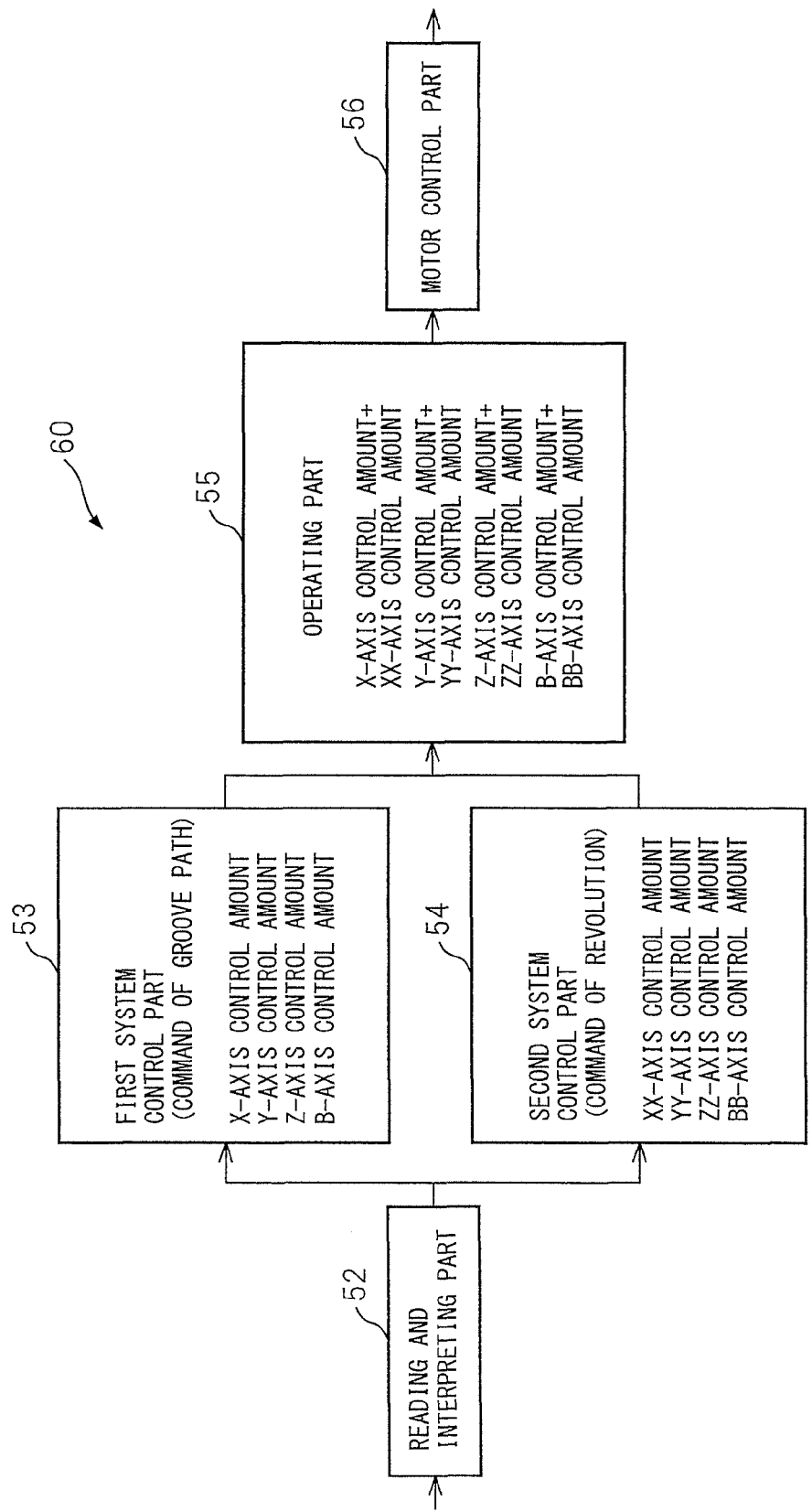
FIG. 8 is a schematic view of a control device of a machine tool in an embodiment.

FIG. 7 is a schematic view of a machining program in the numerical control machine tool in the present embodiment. FIG. 8 is a schematic view of a control device of a machine tool in the present embodiment. Referring to FIG. 2, FIG. 7, and FIG. 8, the machining program 51 is prepared by a user. The machining program 51 is input by the user in accordance with the desired machining shape. In the present embodiment, the G-code is input by the user. The description methods of the codes are predetermined.

In the example of the machining program 51 which is shown in FIG. 7, a code G1001 which commands revolution is described. Further, as a command of a groove path for the rotary tool 22 to move along the machining shape while revolving, the code G01 etc. are described. In this way, the first tool path of movement of the rotary tool 22 and the second tool path of revolution of the rotary tool 22 are set respectively independently corresponding to the machining shape of the workpiece 1. Further, a code G1000 for ending the revolution is described.

The code G1001 of the command for revolution can be set, for example, as shown in the following Table 1.

TABLE 1

| Revolution Commands Input by User | |
|---|---|
| Input code | Explanation of arguments |
| G1001 A B C D | A: Rotation direction of revolution (clockwise rotation: 02, counter-clockwise rotation: 03)<br>B: Groove width<br>C: Feed speed of revolution<br>D: Tool offset number |

The arguments A, B, C, and D for the code G1001 can be set by the user. The argument A is the rotation direction of the revolution. For example, when the direction of rotation of revolution is clockwise, the argument is set to 02. The argument B is the width of the groove part 66. A value larger than the diameter of the rotary tool can be set. The argument C is the feed speed of the revolution motion. Referring to FIG. 4, the feed speed of the revolution is the speed in the tangential direction when the center of rotation 72 which is shown by the arrow mark 92 rotates. The argument D is the tool offset number The tool offset number is the number of the parameter by which the radius of the rotary tool is stored. The distance from the tool center point to the actual machining position is the tool offset. The tool offset corresponds to the radius of the tool. That is, by setting the argument D, the radius of the rotary tool can be designated.

The code G1001 of the command of the revolution is read by the reading and interpreting part 52. In the present embodiment, the reading and interpreting part 52 judges that the code G1001 is a command for revolution. As explained above, the control amount for the rotary tool 22 to revolve is set at the second system control part 54. For this reason, the reading and interpreting part 52 transfers a command for revolution to the second system control part 54.

In the second system control part 54, a program for executing commands of the reading and interpreting part 52 is stored in advance. In the second system control part 54, a code for control of the machine tool is set based on the code G1001. Table 2 explains the codes which are described in the program of the second system control part 54 when receiving a command of the code G1001. The second system control part 54 uses the arguments of the code G1001 as the basis to determine the code for controlling the machine tool. The code G#1 etc. here are stored as sub programs in advance in the second system control part.

TABLE 2

| Code of second system control part | Explanation of arguments |
|---|---|
| G#1 I#2 F#3 | #1: Rotation direction of revolution<br>#2: Radius of revolution<br>#3: Feed speed (tangential direction speed of revolution) |

The variable #1 of the code G#1 of the program of the second system control part shows the direction of rotation of the revolution. For this variable #1, the argument A of the code G1001 of the machining program is cited. When the direction of rotation of the revolution is clockwise, the variable becomes 02 and the code G02 is judged. The code G02 is set in advance as being clockwise circular interpolation.

The variable #2 of the code I#2 sets the distance from the start of the arc to the center of the arc. That is, it sets the radius of revolution. Here, the radius of revolution can be calculated by the following formula (1) based on the code G1001 which is input to the machining program 51.

$$(\text{Radius of revolution})=(\text{groove width}-\text{diameter of rotary tool})/2 \quad (1)$$

where, the groove width can cite the argument B of the code G1001 of the machining program 51. The diameter of the rotary tool can be calculated by the radius of the rotary tool which is determined by the tool offset number of the argument D of the code G1001.

The feed speed is set for the variable #3 of the code F#3. Here, the feed speed of revolution can cite the argument C of the code G1001 of the machining program 51.

In this way, in the present embodiment, the codes of the machining program 51 which the user inputs are used as the basis for the program which is used in the second system control part to be set.

The second system control part uses the set code etc. as the basis to set the control amounts in the directions of the respective axes. In the present embodiment, after the position of the rotary tool on the Z-axis becomes a predetermined position, control is performed to move the rotary tool in the X-axis direction and the Y-axis direction. In the second system control part 54, the control amount of the imaginary axis of the XX-axis and the control amount of the imaginary axis of the YY-axis are set. That is, a second tool path at the time of revolution is set. The output of the second system control part 54 is input to the operating part 55.

Next, the control amount of the rotary tool which advances along with the groove shape is set in accordance with the command of the groove path of the machining program 51. The reading and interpreting part 52 reads the code G01 which sets the groove path. The reading and interpreting part 52 judges the command of the groove path. The reading and interpreting part 52 outputs the machining command to the first system control part 53. The first system control part 53 uses the code G01 as the basis to set the control amounts of the actual axes of the X-axis and Y-axis. That is, the first tool path which advances along the groove shape is set. The fact that the code G01 is control for linear movement is stored in the first system control part. The first system control part sets the control amounts of the respective axes. In the present embodiment, the control amount of the X-axis and the control amount of the Y-axis are output to the operating part 55.

The operating part 55 combines the output of the first system control part and the output of the second system control part. In the present embodiment, it combines the control amounts for the respective axes. For example, in the X-axis direction, the control amount of the X-axis which is output from the first system control part 53 and the control amount of the XX-axis which is output from the second system control part are added to set the final control amount on the X-axis. Further, the control amount of the Y-axis and the control amount of the YY-axis are added to set the final control amount on the Y-axis. In this way, the finally combined third tool path is set.

The motor control part 56 uses control amounts at the respective axes which are calculated at the operating part 55 as the basis to control the servo motors of the respective axes. That is, the movement device uses a third tool path which is formed at the operating part as the basis to make the rotary tool and the workpiece relatively move.

In this way, the control device of a machine tool of the present embodiment is provided with a first system control part which sets a first tool path of advance of a rotary tool and a second system control part which sets a second tool path of revolution of a rotary tool along the machining shape of the workpiece and combines the output of the first system control part and the output of the second system control part. The respective system control parts output control amounts for the respective movement axes corresponding to the respective tool paths. The operating part can combine the control amounts for the respective movement axes to set a third tool path for when the rotary tool advances along the machining shape while revolving.

The control device in the present embodiment can generate a tool path which enables machining of a groove part or hole part which has a width or size greater than the diameter of the rotary tool to be precisely performed even without using a special tool having a planetary rotating mechanism etc. Further, the numerical control machine tool can perform machining precisely even without using such a special tool. Further, while it is difficult to increase the depth of cut with a tool which has a planetary rotating mechanism etc., the numerical control machine tool in the present embodiment can increase the depth of cut and thereby reduce the machining time.

Further, in the present embodiment, even without changing the head part of the rotary tool, it is possible to change the machining program to change the groove width or size of the hole part etc. That is, it is possible to easily change the groove width or the size of the hole part even without changing the rotary tool. Furthermore, even when galling etc. of the rotary tool causes the rotary tool to change in radius, it is easy to adjust the groove width. For example, by adjusting the input of the machining program, it is possible to make fine adjustments for galling of the rotary tool.

Further, the control device in the present embodiment can input the tool path of the revolution and the tool path of the groove path independently in the input program, so the input program can be easily generated.

In this regard, when starting to machine the workpiece 1, if simultaneously starting advance along the machining shape and revolution of the rotary tool 22, sometimes uncut parts remain. Therefore, the first system control part 53 in the present embodiment sets the first tool path so that when starting to machine the workpiece 1, the rotary tool 22 revolves by a predetermined rotational angle, then advances along the machining shape of the workpiece 1. For example, it is possible to make the control amount which is set by the first system control part 53 zero until making the rotary tool revolve once by the second system control part 54. By performing this control, it is possible to suppress the occurrence of uncut parts and other insufficiently machined parts at the starting parts of machining. In particular, it is possible to more reliably suppress the formation of uncut parts by the rotary tool 22 revolving one time or more.

The rotational angle for revolution is not limited to a single revolution and can be set in accordance with need. For example, if half revolution enables uncut parts to be suppressed, half revolution can be set. Further, as the rotational angle for revolution, it is possible to input the angle around the center of revolution and also input the time period for revolution so as to set the rotational angle for revolution in advance. A code etc. for revolution at a predetermined rotational angle can be set in advance in a sub program which is stored in the first system control part 53 or second system control part 54. Alternatively, the user may input a command for revolution at a predetermined rotational angle in the machining program being prepared and perform control based on commands of the machining program.

Figure 9:
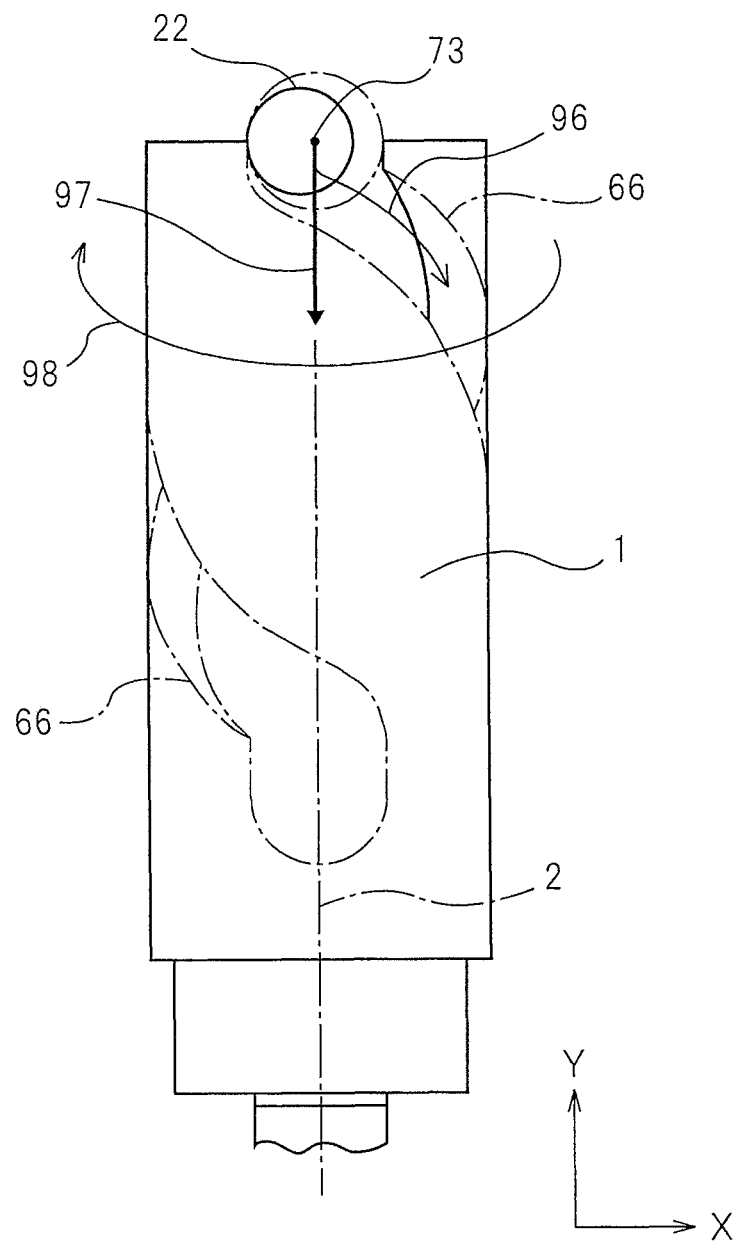
FIG. 9 is a schematic front view at the time when a groove part is formed in a second workpiece in an embodiment.

FIG. 9 is a schematic plan view of a second workpiece 1 in the present embodiment. In the second workpiece 1, a groove part 66 which extends in a spiral shape on the surface is the columnar shaped workpiece 1 is formed. By machining such a groove part 66, for example, it is possible to produce a cylindrical cam or a globoidal cam etc.

Referring to FIG. 1, when forming a groove part 66 of the second workpiece 1, the workpiece 1 is fastened to the rotary table 42 so that the center axis 2 of the workpiece 1 becomes parallel to the Y-axis. Further, the workpiece 1 is fastened so that the center axis 2 matches with the axis of rotation of the rotary table 42. In the machining of the second workpiece 1, in addition to movement in the X-axis direction and Y-axis direction, the workpiece is made to rotate in the B-axis direction. The workpiece 1 is made to rotate about its center axis 2 as the axis of rotation while make it move relatively in the X-axis and Y-axis directions.

In the case of performing such machining as well, a first tool path of the center of revolution 73 along the machining shape which is shown by the arrow mark 96 can be set by the first system control part 53. That is, a tool path at the X-axis, Y-axis, and B-axis is set. Further, a second tool path of revolution of the rotary tool 21 with respect to the center of revolution 73 can be set by the second system control part 54. That is, a tool path in the XX-axis, YY-axis, and BB-axis is set. The operating part 55 can combine the output from the first system control part 53 and the output from the second system control part 54 to set a third tool path. In actual machining, the revolving rotary tool 22 is made to move in the Y-axis direction shown by the arrow mark 97 while the workpiece 1 is made to rotate in the B-axis direction as shown by the arrow mark 98 so as to be able to form the groove part 66. In this way, the control device and numerical control machine tool in the present embodiment can be applied to not only planar machining, but also three-dimensional machining.

The movement device which makes the rotary tool 22 and the workpiece 1 relatively move in the present embodiment is formed to make the rotary tool 22 move with respect to the workpiece 1 in the X-axis and Y-axis and make the workpiece 1 move with respect to the rotary tool 22 in the Z-axis and B-axis, but the invention is not limited to this. The movement device need only be formed so that at least one of the workpiece and rotary tool can move relative to their axes.

In the present embodiment, machining for forming a groove part in a workpiece is illustrated for explanation, but the invention is not limited to this. The present invention can also be applied to any machining. For example, the present invention can also be applied to cutting for forming a depressed part in the surface of a workpiece, cutting of an end face of a workpiece, etc. Furthermore, the machining of the workpiece is not limited to cutting. The present invention can applied to any machining.

Further, in the present embodiment, a so-called horizontal type machining center is illustrated for the explanation, but the invention is not limited to this. The present invention can be applied to any numerical control machine tool.

The above embodiments can be suitably combined. In the above figures, the same or equivalent parts are assigned the same reference notations. Note that, the above embodiments are only illustrations and do not limit the invention.

REFERENCE SIGNS LIST 1 workpiece
10 numerical control machine tool
14 table
16 column
20 spindle
22 rotary tool
25 Z-axis servo motor
31 Y-axis servo motor
38 X-axis servo motor
43 B-axis servo motor
51 machining program
52 reading and interpreting part
53 first system control part
54 second system control part
55 operating part
60 control device
66 groove part
72 center of rotation
73 center of revolution

The invention claimed is:

1. A control device of a machine tool which makes a rotary tool rotate around a rotation axis that is in the rotary tool, and makes the rotation axis of the rotary tool revolve around another rotation axis that is not the rotation axis of the rotary tool, the machine tool comprising a plurality of feed axes that perform a revolution movement of the rotation axis of the rotary tool and a translation movement of the rotation axis of the rotary tool along a surface of a workpiece so as to machine the workpiece, the control device comprising:

a reading and interpreting part which reads a machining program in which a command of a first system relating to the translation movement of the rotation axis of the rotary tool along the surface of the workpiece and a command of a second system relating to the revolution movement of the rotation axis of the rotary tool are set; and an operating part which combines, for each axis, a control amount of the first system which drives a corresponding axis so that the translation movement of the rotation axis of the rotary tool is performed based on the command of the first system and a control amount of the second system which drives a corresponding axis so that the revolution movement of the rotation axis of the rotary tool is performed based on the command of the second system, and calculates a control amount so that both the translation movement and the revolution movement are performed at the same time.

2. The control device of a machine tool according to claim 1, wherein at a start of machining the workpiece, the operating part calculates the control amount in which the control amount of the first system and the control amount of the second system are combined so that the rotation axis of the rotary tool translates along the surface of the workpiece after the rotation axis of the rotary tool revolves by a predetermined rotational angle of the control amount of the second system.

3. A machine tool which makes a rotary tool rotate around a rotation axis that is in the rotary tool, and makes the rotation axis of the rotary tool revolve around another rotation axis that is not the rotation axis of the rotary tool, the machine tool comprising a plurality of feed axes that perform a revolution movement of the rotation axis of the rotary tool and a translation movement of the rotation axis of the rotary tool along a surface of a workpiece so as to machine the workpiece, the machine tool comprising:

a reading and interpreting part which reads a machining program in which a command of a first system relating to the translation movement of the rotation axis of the rotary tool along the surface of the workpiece and a command of a second system relating to the revolution movement of the rotation axis of the rotary tool are set; and an operating part which combines, for each axis, a control amount of the first system which drives a corresponding axis so that the translation movement of the rotation axis of the rotary tool is performed based on the command of the first system and a control amount of the second system which drives a corresponding axis so that the revolution movement of the rotation axis of the rotary tool is performed based on the command of the second system, and calculates a control amount so that both the translation movement and the revolution movement are performed at the same time; and a movement device which uses the control amount which is combined at the operating part as the basis to make the rotary tool and workpiece relatively move.

* * * * *